United States Patent [19]
Takada

[11] Patent Number: 5,373,495
[45] Date of Patent: Dec. 13, 1994

[54] DISK PLAYBACK APPARATUS

[75] Inventor: Yuichi Takada, Higashimatsuyama, Japan

[73] Assignee: Chuo Denki Co. Ltd., Japan

[21] Appl. No.: 168,413

[22] Filed: Dec. 17, 1993

Related U.S. Application Data

[63] Continuation of Ser. No. 953,139, Sep. 29, 1992, abandoned.

[30] Foreign Application Priority Data

Oct. 7, 1991 [JP] Japan .................. 3-287062

[51] Int. Cl.$^5$ .................. G11B 5/09; G11B 15/52
[52] U.S. Cl. .................. 369/189; 369/239; 369/266; 318/39; 318/51
[58] Field of Search .............. 369/239, 240, 241, 189, 369/266; 318/39, 41, 51, 55; 369/75.2

[56] References Cited

U.S. PATENT DOCUMENTS

| | | | |
|---|---|---|---|
| 4,239,237 | 12/1980 | Pyles | 369/266 X |
| 4,338,683 | 7/1982 | Furukawa et al. | 369/189 X |
| 4,417,332 | 11/1983 | Kelleher | 369/266 |
| 4,575,835 | 3/1986 | Nishikawa et al. | 369/240 X |
| 5,001,570 | 3/1991 | Tagawa | 369/240 X |
| 5,050,145 | 9/1991 | Yoshida | 369/189 X |
| 5,063,552 | 11/1991 | Shigemori | 369/240 X |
| 5,067,121 | 11/1991 | Einhaus | 369/75.2 |
| 5,093,820 | 3/1992 | Maeda et al. | 369/189 X |

Primary Examiner—Edward K. Look
Assistant Examiner—Hoang Nguyen
Attorney, Agent, or Firm—Ronald R. Snider

[57] ABSTRACT

A disk playback apparatus designed such that the linear velocity of the disk is stabilized during a short period corresponding to one to several revolutions of the disk and occurrence therein of vibration and noise is suppressed is disclosed. The apparatus is characterized in that the revolving axis of the turntable on which the disk is mounted is driven by a low-torque spindle motor and the wheel effect of the revolving axis or the spindle motor is made larger.

17 Claims, 6 Drawing Sheets

DISK PLAYBACK APPARATUS

This application is a continuation of application Ser. No. 07/953,139, filed Sep. 29, 1992 now abandoned.

BACKGROUND OF THE INVENTION

The present invention relates to a disk playback apparatus for playing back a disk such as a video disk and a digital audio disk.

So far, when information such as music recorded on a CD (compact disk) as a digital audio disk is read, the spindle motor for driving the disk has been controlled, for example, as disclosed in Japanese laid-open Patent publication No. 59-77673 (G11B19/24). More specifically, since control by the CLV system, in which the CD is revolved at a constant linear velocity, is executed in the reading of the CD, the linear velocity of the CD is required to be constant throughout the reading of the CD from its inside to its outside. To achieve this, the number of revolutions of the disk is changed approximately from 600 rpm when the inside is read to 200 rpm when the outside is read.

Further, in order to keep the linear velocity constant even during a short period that corresponds to one to several revolutions, while adapting it to the eccentricity factor, the spindle motor has been arranged to have a high torque and a small inertia, and the wheel effect has been made small, and the constant linear velocity has been attained by executing fine control of the linear velocity (CLV control) through comparison of a disk linear velocity detection signal obtained from the pickup with a reference signal, with the number of revolutions of the spindle motor changed, for example, 0.28% to 1.12% at the inside and 0.12% to 0.47% at the outside of the CD.

In such playback apparatus, however, since the number of revolutions of the spindle motor having a considerable amount of inertia is minutely changed, some acceleration is required, and this causes changes in the torque. Thereby, the entire system is swung and playback effects of the CD are lessened due to the resultant vibration. Further, there has been a problem that electric noises are frequently produced because of the use of a high-torque spindle motor.

SUMMARY OF THE INVENTION

The present invention was made to solve those technical problems involved in the conventional apparatus. Accordingly an object of the present invention is the provision of a disk playback apparatus in which the linear velocity of the disk is stabilized even during a short period corresponding to one to several revolutions and, further, production of vibrations and noises is reduced.

The disk playback apparatus of the present invention comprises a turntable for mounting a disk thereon, a revolving axis of the turntable, and a low-torque spindle motor for driving the revolving axis, and therein, the wheel effect of the revolving axis or the spindle motor is made larger.

DETAILED DESCRIPTION OF THE PREFERRED EMBODIMENTS

The disk playback apparatus of the present invention comprises a turntable for mounting a disk thereon, a revolving axis of the turntable, and a low-torque spindle motor for driving the revolving axis, and therein, the wheel effect of the revolving axis or the spindle motor is made larger. With such arrangement, the number of revolutions of the spindle motor is stabilized during a short period that corresponds to one to several revolutions and the linear velocity is also stabilized. Therefore, the production of vibration due to minute control of the spindle motor and occurrence of noise on account of the use of a high-torque spindle motor as was usual with apparatuses of the conventional art can be reduced, and thus, stabilized signal reading can be achieved and playback effects of the disk can be enhanced.

Embodiments of the present invention will be described below with reference to FIG. 1 to FIG. 5.

Figure 1:
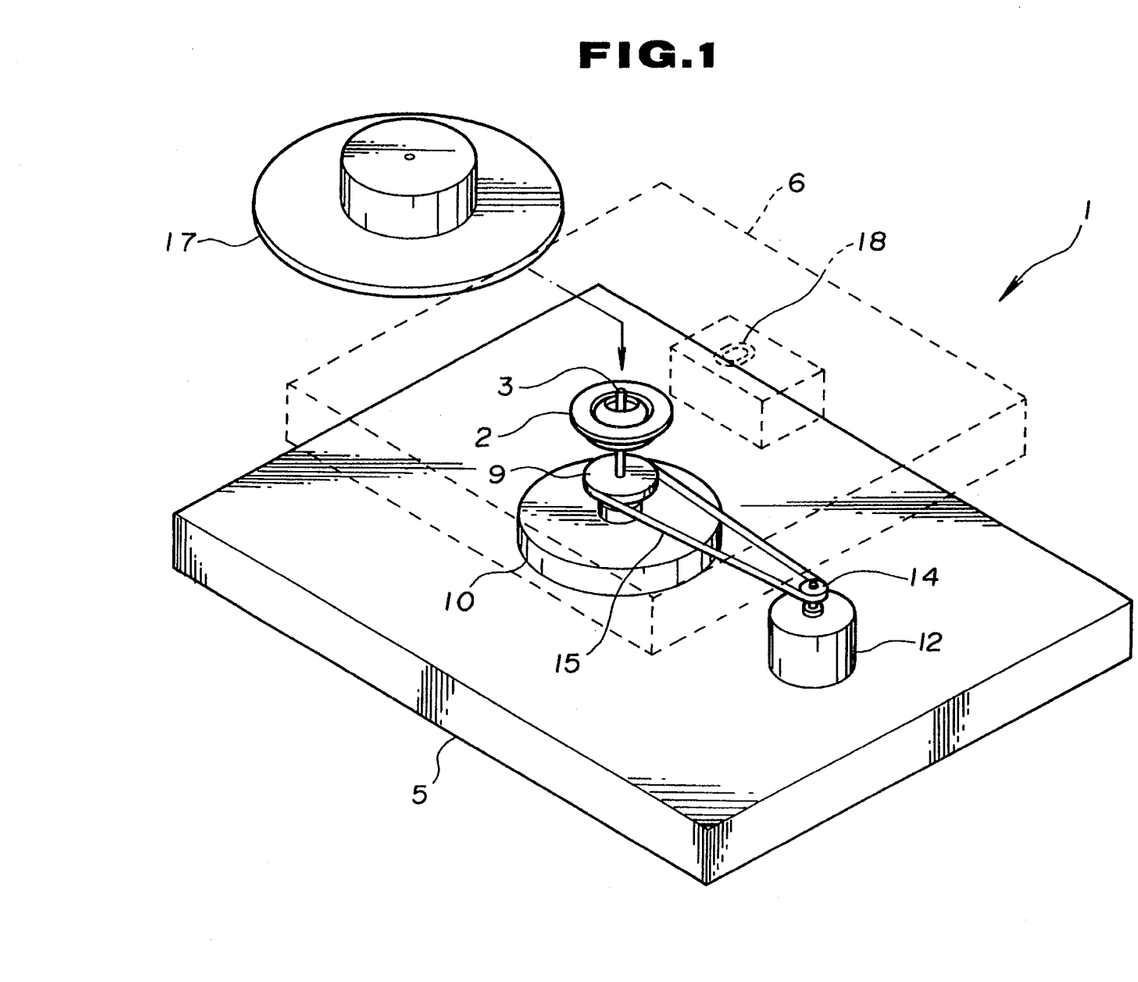
FIG. 1 is a perspective view of a disk playback apparatus of an embodiment of the present invention.
Figure 2:
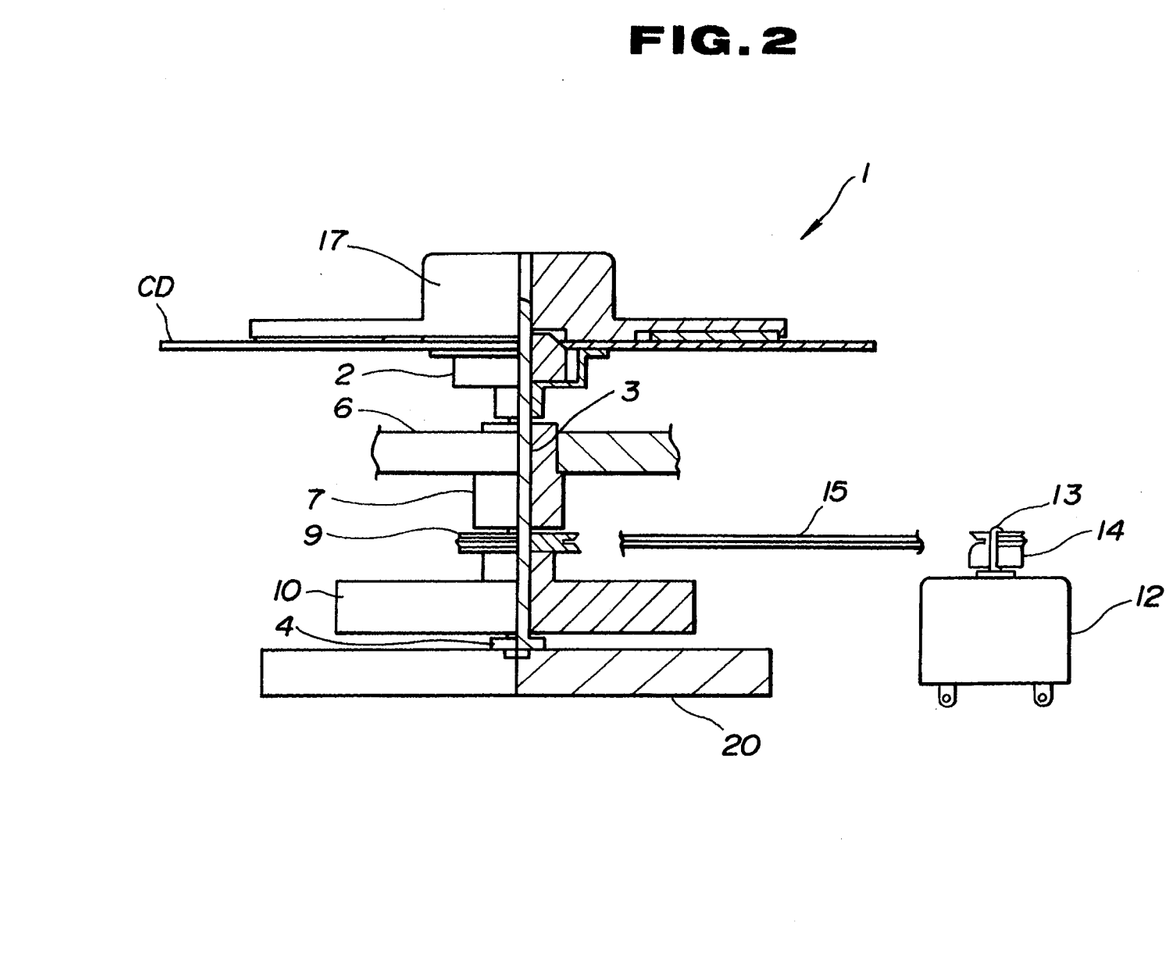
FIG. 2 is a side view partly in longitudinal section of a disk playback apparatus according to the present invention.

In FIG. 1 and FIG. 2, a turntable 2 mounting a digital audio disk CD thereon is fixed to the top of a revolving axis 3 set upright. The revolving axis 3 has its bottom end supported on a support plate 20 through a lower bearing 4. The support plate 20 is fixed to table 6 disposed above a base 5 in parallel therewith, such that the support plate 20 is hanged from the table 6 through shafts, which are not shown. The upper portion of the revolving axis 3 is passed through the table 6 and supported by the table 6 through an upper bearing 7. The revolving axis 3 is projecting from the upper surface of the table 6 and has the turntable 2 fixed thereto at the position above the table 6. Below the upper bearing 7 of the revolving axis 3, there is provided a pulley 9, and at the position between the pulley 9 and the lower bearing 4, there is provided a metallic flywheel 10 with a predetermined radius and thickness coaxially fixed to the revolving axis 3.

On the base 5 at one side of the lower bearing 4, there is disposed a spindle motor 12 constituted of a DC motor with a low-torque output, and a pulley 14 is fixed to a driving axis 13 of the spindle motor 12 projecting upward from the same. Stretched around two pulleys, i.e., the pulley 14 and the pulley 9 of the revolving axis 3, there is provided a rubber belt 15 whereby driving force of the spindle motor 12 is transmitted to the revolving axis 3. Thus, in the arrangements of FIG. 1 and FIG. 2, the flywheel 10 is coaxially fixed to the revolving axis 3 so as to revolve together with the revolving axis 3 and, thereby, the wheel effect of the revolving axis 3 is made larger.

When playing back a disk CD, the disk CD is mounted on the turntable 2, and, then, a stabilizer 17 is placed over the disk CD and the spindle motor 12 is driven. Reference numeral 18 denotes a pickup provided on the table 6. The pickup 18 is adapted to be moved from the inside to the outside of the disk CD by a later described feed motor so as to throw a laser beam from a semiconductor laser on the pits formed on the signal recording surface on the back side of the disk CD to thereby obtain, from the reflected beam, such signals as an information signal of music, a later described subcode, and a pickup servo signal (hereinafter these signals together will be called "pickup signal").

Figure 3:
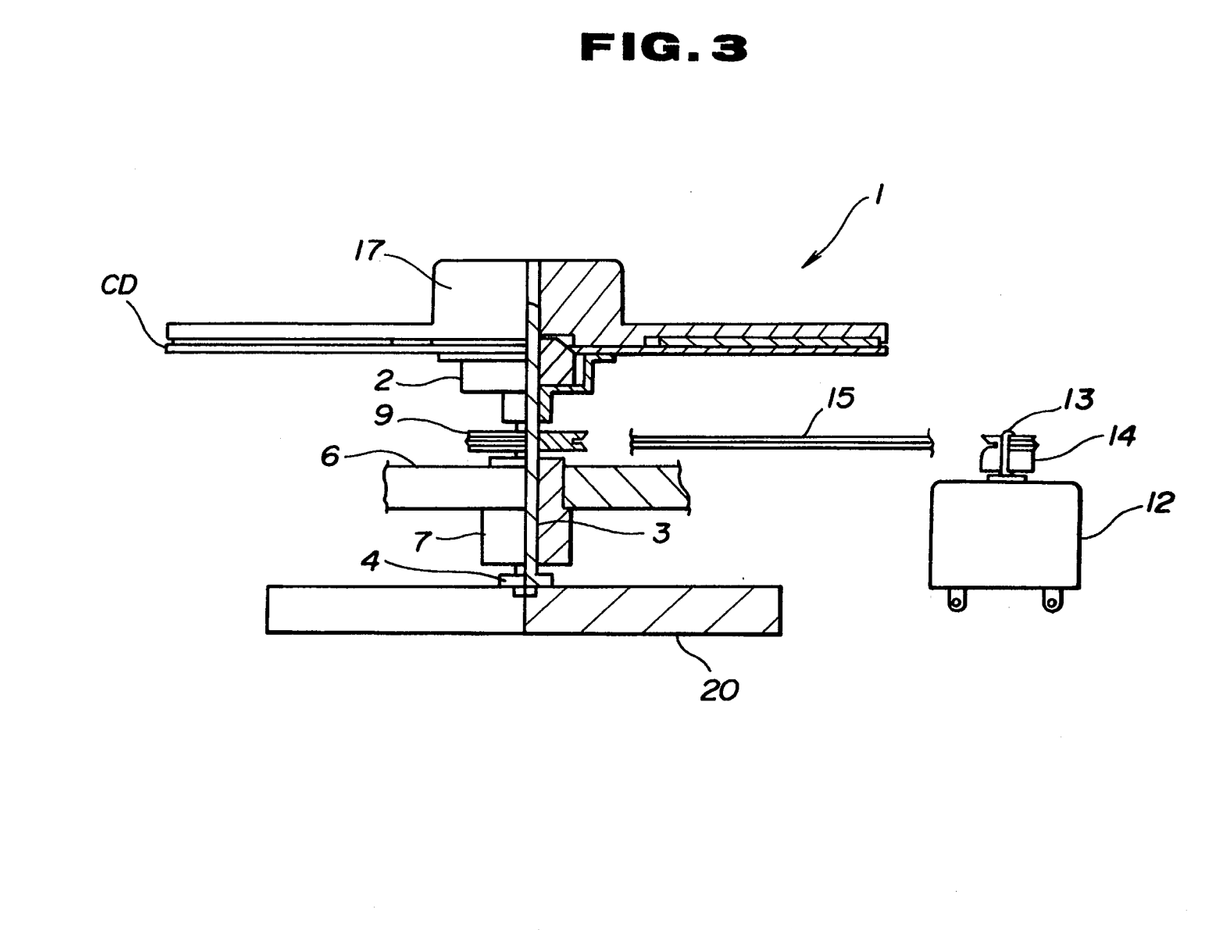
FIG. 3 is a side view partly in longitudinal section of a disk playback apparatus as another embodiment of the present invention.

FIG. 3 shows another embodiment of the disk playback apparatus 1 in a different structure. In this case, no flywheel is used but the pulley 9 is fixed to the revolving axis 3 at the position above the upper bearing 7. Meanwhile, the stabilizer 17 is formed of brass and made larger in size. By placing such large-sized stabilizer 17 over the disk CD coaxially with the revolving axis 3, the wheel effect is made larger the same as in the above described embodiment. By this arrangement, the effect of the stabilizer 17 preventing the disk CD from warping and vibrating is enhanced.

Figure 4:
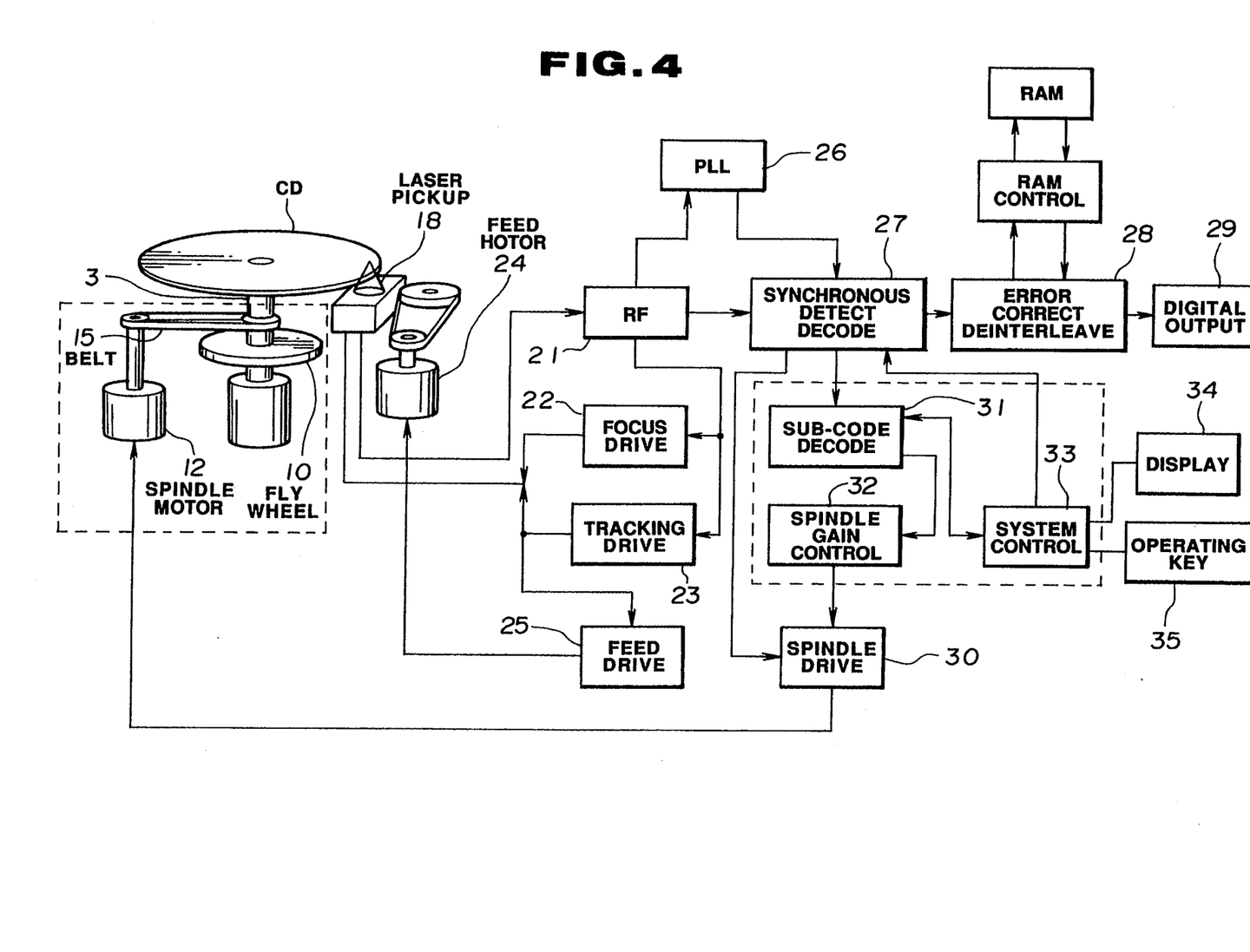
FIG. 4 is a block diagram of a control circuit of the disk playback apparatus according to the present invention.

Referring now to the control circuit shown in FIG. 4, the pickup signal obtained by the pickup 18 is input to an RF circuit 21 and, therein, the signal is shaped for waveform and amplified. The pickup servo signal output from the RF circuit 21 is input to a focus drive circuit 22 and a tracking drive circuit 23. By the focus drive circuit 22 and the tracking drive circuit 23, the pickup 18 and a feed drive circuit 25 for driving a feed motor 24 for moving the pickup 18 are controlled.

The pickup signal output from the RF circuit 21 is input to a synchronous detect decode circuit 27. Meanwhile, in the RF circuit 21, a synchronizing signal included in the sub-code is extracted and this synchronizing signal is input to a PLL 26. A clock signal generated in the PLL 26 is input to the synchronous detect decode circuit 27. In the synchronous detect decode circuit 27, the pickup signal is decoded and the decoded signal is input to an error correct deinterlieve circuit 28. In the error correct deinterlieve circuit 28, errors in the music information signal due to scratches or defects of the disk CD are corrected and the corrected signal is output from a digital output circuit 29 to a D/A converter, not shown.

In the synchronous detect decode circuit 27, synchronous detection of the revolving speed is also made according to the clock signal generated by the PLL 26, and the control amount for increasing the speed when it is low and decreasing the speed when it is high is output therefrom in the form of the pulse width and supplied to a spindle drive circuit 30. Fluctuations due to eccentricity of the disk CD is also corrected at this stage. The pickup signal decoded in the synchronous detect decode circuit 27 is also input to a sub-code decode circuit 31, wherein the sub-code including time information such as the playback time and index information is extracted and the extracted signal is supplied to a spindle gain control circuit 32. In the spindle gain control circuit 32, the servo gain for the spindle drive circuit 30 is calculated according to the time information in the sub-code and it is output to the spindle drive circuit 30. The spindle drive circuit 30 controls the spindle motor 12 according to the control amount from the synchronous detect decode circuit 27 and the servo gain from the spindle gain control circuit 32. Reference numeral 33 denotes a system control to which a display 34 and an operating key 35 are connected.

Figure 5:
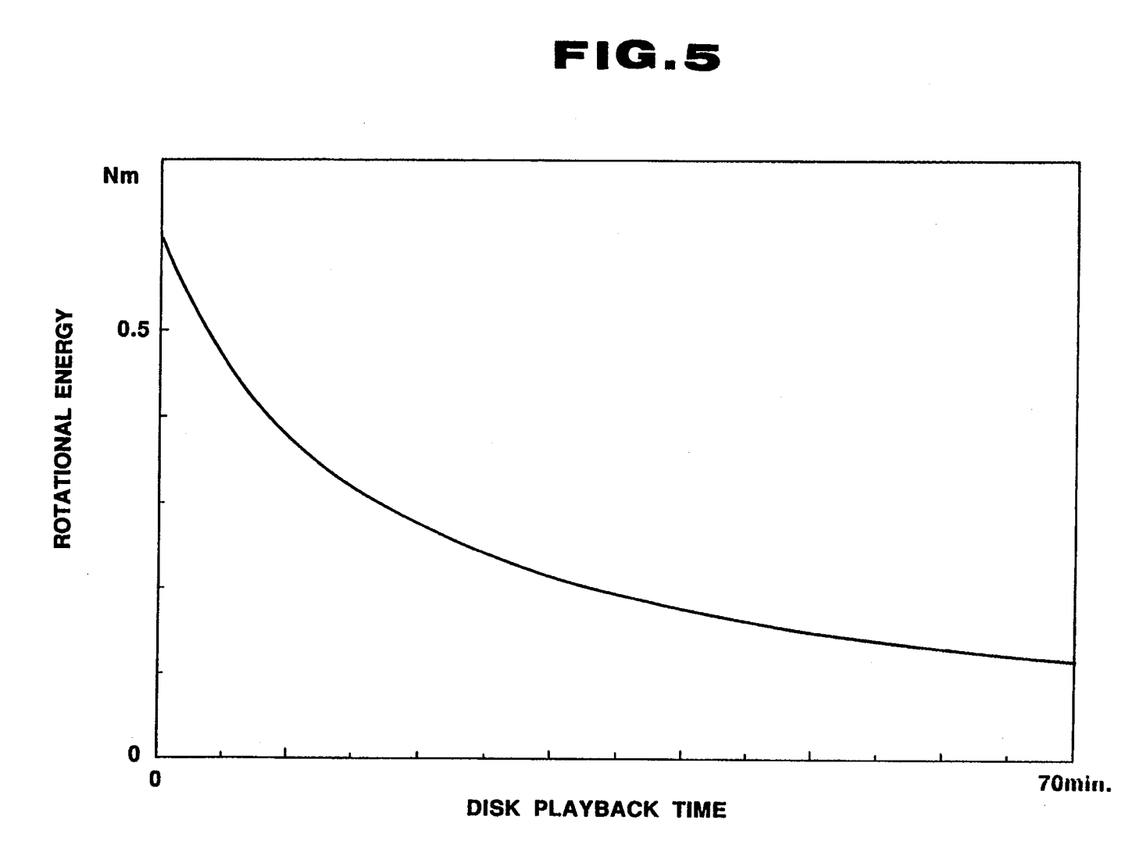
FIG. 5 is a graph showing variation of rotational energy with playback time of disk driven at linear velocity of 1.3 m/sec.

Now, operation of the disk playback apparatus 1 of the present invention will be described below with reference to FIG. 4 and FIG. 5. The spindle motor 12 is driven by the spindle drive circuit 30. When the spindle motor 12 is driven, the driving force is transmitted to the revolving axis 3 through the pulley 14, belt 15, and pulley 9, and thereby the revolving axis 3 is revolved. At this time, the wheel effect of the revolving axis 3 is made larger as described above (for example, the moment of inertia is 26 times as large as that in the ordinary case) and, if the number of revolutions of the spindle motor 12 is kept unchanged, the number of revolutions of the revolving axis 3 is kept constant and very much stabilized as if it is in the CAV (constant number of revolutions) state. Further, when the linear velocity is controlled to become constant, the change in revolving speed to be effected in one revolution of the disk CD is only 0.0064% at the inside and 0.0027% at the outside. Accordingly, when the number of revolutions is stabilized, it is even possible to consider the linear velocity of the portion of the disk CD, on which the laser beam is thrown, to be practically constant during the period corresponding to one to several revolutions.

While the synchronous detect decode circuit 27 outputs a control amount to the spindle drive circuit 30 such that the linear velocity of the portion of the disk CD on which the laser beam from the pickup 18 is thrown becomes 1.3 m/sec., because the linear velocity is very much stabilized during such a short period as corresponds to one to several revolutions as described above, the control amount of the spindle motor 12 during such short period is made smaller. Since the torque of the spindle motor 12 is arranged here to be low, the number of revolutions of the CD is kept unchanged in substance or its change, if any, is very small. Therefore, the vibration as was usual with the apparatus of the conventional art due to minute control is seldom produced and occurrence of electric noises can be reduced because of the use of a low-torque motor for the spindle motor 12.

In the course of a long period during which the pickup 18 is shifted from the inside to the outside of the disk CD, the synchronous detect decode circuit 27 controls the spindle motor 12 according to the movement of the pickup 18 so that the number of revolutions of the disk CD is gradually changed, for example, from 600 rpm to 200 rpm, and the linear velocity is kept at 1.3 m/sec.

Since, here, the torque of the spindle motor 12 is made lower while the wheel effect of the revolving axis 3 is made larger, the starting time or the accessing time of the spindle motor 12 becomes longer. Therefore, it is adapted such that the gain control circuit 32 makes the servo gain for the spindle drive circuit 30 larger at the time of starting and accessing according to the sub-code to thereby increase the torque of the spindle motor 12 and decrease the starting time and accessing time.

The rotational energy is proportional to the square of the velocity. Since the wheel effect of the revolving axis 3 is made larger especially in the present invention, the total rotational energy of the members including the revolving axis 3, disk CD, flywheel 10, and stabilizer 17 largely varies according to the disk playback time as shown in FIG. 5, i.e., it is larger at the inside and becomes smaller according as the played back portion approaches the outside. Therefore, if the control is made with a constant servo gain provided by the spindle drive circuit 30 for the spindle motor 12, the torque of the spindle motor 12 will be insufficient at the inside of the disk CD and will conversely be excessive at the outside, and this may create a danger that smooth adjustment of the number of revolutions of the spindle motor 12 becomes unable and external disturbances are caused.

Therefore, it is arranged such that the playback time is detected from the time information in the sub-code and suitable servo gain in accordance with the playback time of the disk CD is calculated to be supplied to the spindle drive circuit 30. The spindle drive circuit 30, according to the servo gain supplied thereto, changes the torque of the spindle motor 12. More specifically, the servo gain is made larger at the inside and smaller at the outside, whereby the number of revolutions of the spindle motor 12 is smoothly changed and external disturbances are prevented from occurring.

Although, in the above described embodiment, a belt drive system for driving the revolving axis 3 by means of a belt 15 was adopted, the present invention is not limited to such arrangement but is still effective even if a direct drive system in which the revolving axis 3 is directly coupled to the axis 13 of the spindle motor 12 is employed. However, by driving the revolving axis 3 by means of the belt 15 as in the above described embodiment, the vibration, if it is produced when the number of revolutions of the spindle motor 12 is changed when going from the inside to the outside, can be absorbed by the belt 15 and prevented from being transmitted to the revolving axis 3.

Although, in the above described embodiment, the wheel effect of the revolving axis 3 was made larger by fixing a flywheel 10 or a large-sized stabilizer 17 to the revolving axis 3, the wheel effect of the spindle motor 12 itself may be made larger instead. Further, although the spindle motor 12 was constituted of a DC motor, it may be constituted of an AC motor.

According to the present invention, as described above, the wheel effect of the revolving axis of the turntable or the spindle motor is made larger and a low-torque motor is used as the spindle motor. Therefore, the number of revolutions of the spindle motor is stabilized during a short period corresponding to one or several revolutions and, hence, the linear velocity is also stabilized. Accordingly, it becomes possible to reduce the vibration occurring in the control of the spindle motor, as was usual with the apparatus of the conventional art, and the noise due to the use of a high-torque motor, and to thereby achieve stabilized signal reading and obtain improved disk playback effects.

Figure 6:
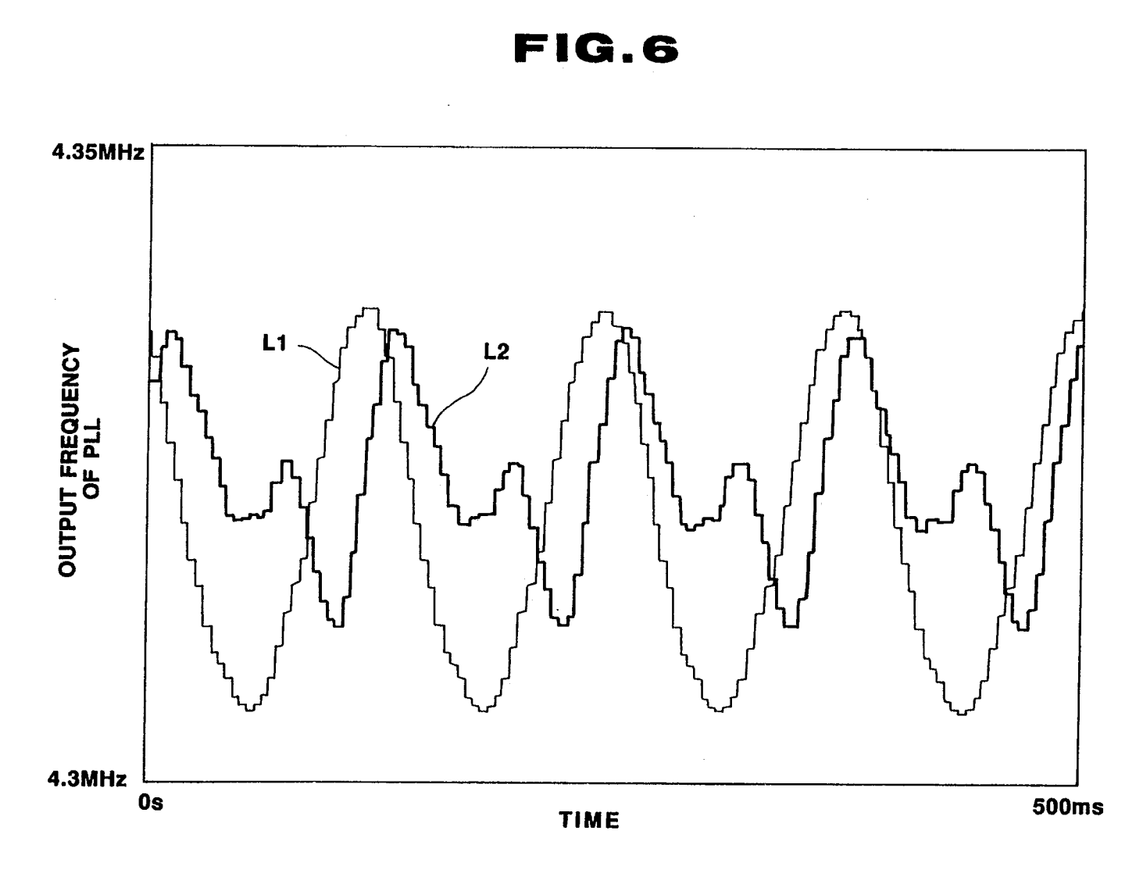
FIG. 6 is a graph showing variation of out put frequency of PLL.

As shown in FIG. 6, in case of using high torque and small wheel effect spindle motor and direct drive system, the number of revolutions of the spindle motor is unstable by the vibration, so that the variation of the output frequency of the PLL becomes irregular waveform like the line L2 in FIG. 6. On the other hand, according to the present invention, the number of revolutions of the spindle motor 12 is stabilized, so that the variation of the output frequency of the PLL 26 becomes regular sine wave like the line L1 in FIG. 6 by eccentricity of the disk CD.

Further, since the playback time is detected according to the time information obtained from the pickup signal and suitable servo gains for changing the torque of the spindle motor 12 are calculated in accordance with the disk playback time, control of the number of revolutions of the spindle motor 12 can be smoothly performed and occurrence of external disturbance can be prevented.

What is claimed is:

1. A disk playback apparatus for revolving a disk and playing back information on the disk comprising:

a turntable for mounting said disk thereon, said turntable having a revolving axis;

a spindle drive motor;

a controller for controlling said spindle drive motor, wherein said controller supplies a first control amount and a second gain control amount which is derived from subcode time information recorded on the disc to said spindle motor;

wherein said controller obtains time and index information from said subcode time information on a said disk and changes spindle gain for a spindle drive for said spindle motor so as to have large gain at the inside and smaller gain at the outside of the disk according to the subcode time information; and wherein said controller controls said spindle motor so that the linear velocity of said disk becomes constant and, during a short period that corresponds to one to several revolutions of said disk.

2. The apparatus in accordance with claim 1, wherein said spindle drive motor is a low torque motor.

3. The apparatus in accordance with claim 1, further comprising means for providing a large wheel effect for said spindle motor.

4. The apparatus in accordance with claim 3, wherein said means for supplying a large wheel effect is a flywheel coaxially fixed to said turntable revolving axis.

5. The apparatus in accordance with claim 1, wherein said control amount is for increasing and decreasing speed within several spindle revolutions.

6. The apparatus in accordance with claim 5, wherein said control amount is in the form of a pulse width supplied to a spindle drive circuit.

7. The apparatus in accordance with claim 5, wherein said second gain control amount decreases as the speed of said revolving disk decreases.

8. A disk playback apparatus for revolving a disk and playing back information recorded on a recording surface comprising:

a turntable for mounting a disk, said turntable having a spindle;

a spindle motor for driving said spindle;

a controller for controlling said spindle motor according to information on said disk, said controller having a spindle drive, said spindle drive having a second input for receiving a gain control derived from subcode time information and a first input for receiving a control amount for increasing disk speed when speed is low and decreasing the speed when speed is high.

9. The apparatus in accordance with claim 8, wherein said second input receives subcode time information including index information and playback information.

10. The apparatus in accordance with claim 8, wherein said control amount is generated by a phase lock loop and a synchronous detect code circuit.

11. The apparatus in accordance with claim 8, wherein said subcode time information is used to generate a variable gain which varies according to a radial position of a playback transducer on said disk.

12. The apparatus in accordance with claim 8, wherein when servo gain is smaller when the pickup head is located outside of the disk.

13. The apparatus in accordance with claim 11, wherein said variable gain is a function of angular momentum of said turntable.

14. The apparatus in accordance with claim 1 further comprising a belt drive connected to said spindle motor and said turntable.

15. The apparatus in accordance with claim 8 further comprising a belt drive connected to said spindle motor and said turntable.

16. The apparatus in accordance with claim 1, further comprising a large sized stabilizer placed on said turntable.

17. The apparatus in accordance with claim 8, further comprising a large sized stabilizer placed on said turntable.

* * * * *